United States Patent
Raccah et al.

(10) Patent No.: US 7,237,027 B1
(45) Date of Patent: Jun. 26, 2007

(54) SCALABLE STORAGE SYSTEM

(75) Inventors: David Raccah, San Jose, CA (US);
George Feinberg, Windham, ME (US);
Olaf W. Manczak, Hayward, CA (US);
Kacper Nowicki, Hayward, CA (US);
Waheed Qureshi, Danville, CA (US);
Luis Ramos, Glendale, CA (US)

(73) Assignee: Agami Systems, Inc., Sunnyvale, CA (US)

( * ) Notice: Subject to any disclaimer, the term of this patent is extended or adjusted under 35 U.S.C. 154(b) by 373 days.

(21) Appl. No.: 09/709,187

(22) Filed: Nov. 10, 2000

(51) Int. Cl.
*G06F 15/173* (2006.01)

(52) U.S. Cl. .................. 709/226; 709/213; 709/217; 709/224; 707/10; 714/4

(58) Field of Classification Search ............ 714/4; 709/214, 105, 215, 213, 216, 217, 224, 226; 707/10
See application file for complete search history.

(56) References Cited

U.S. PATENT DOCUMENTS

| | | | |
|---|---|---|---|
| 5,537,585 | A | 7/1996 | Blickenstaff et al. |
| 5,951,694 | A * | 9/1999 | Choquier et al. ............ 714/15 |
| 5,966,707 | A | 10/1999 | Van Huben et al. |
| 5,978,577 | A * | 11/1999 | Rierden et al. ............. 707/10 |
| 6,067,545 | A * | 5/2000 | Wolff .......................... 707/10 |
| 6,230,200 | B1 | 5/2001 | Forecast et al. |
| 6,279,040 | B1 * | 8/2001 | Ma et al. ................... 709/231 |
| 6,298,451 | B1 * | 10/2001 | Lin ............................... 714/4 |
| 6,349,357 | B1 * | 2/2002 | Chong, Jr. .................. 711/111 |
| 6,393,466 | B1 | 5/2002 | Hickman et al. |
| 6,401,121 | B1 | 6/2002 | Yoshida et al. |
| 6,523,130 | B1 * | 2/2003 | Hickman et al. .............. 714/4 |
| 6,542,951 | B1 * | 4/2003 | Sangveraphunski et al. ......................... 710/305 |
| 6,564,252 | B1 * | 5/2003 | Hickman et al. ........... 709/214 |
| 6,714,979 | B1 * | 3/2004 | Brandt et al. ............... 709/225 |

OTHER PUBLICATIONS

PCT International Search Report dated Sep. 18, 2002 corresponding to PCT/US02/18601.
U.S. Appl. No. 09/659,107, Nowicki et al. Not Published.
Nowicki, Bill, Request for Comments (RFC) 1094, "NFS:Network File System Protocol Specification," Mar. 1989.
"RAIN Technology Reliable Array of Independent Nodes: A Layer 3 Clustering Platform for Mission Critical Internet Applications," Raifinity White Paper, Nov. 2000.
PCT Written Opinion dated Apr. 9, 2004 corresponding to PCT/US02/18601.

* cited by examiner

*Primary Examiner*—Saleh Najjar
*Assistant Examiner*—Liang-Che Alex Wang
(74) *Attorney, Agent, or Firm*—DLA Piper US LLP

(57) ABSTRACT

According to one embodiment, a storage system (400) may include a gateway service (402), metadata service (404) and storage service (406) that each provide different storage system functions. Each service (402, 404 and 406) may include a plurality of servers that are functionally de-coupled from one another. De-coupled servers may service requests without regard to the operation of other servers of the same service. Such a de-coupled arrangement can allow a storage system (400) to be scaled to meet increasing demands, as servers may be added to a system, on a service by service basis, without necessarily re-indexing stored information or reconfiguring multiple instances of a server application. Further, backup servers may be easily added to the system to enable fault tolerance. Servers of a particular service (402, 404 and 406) may be accessed according to a quality of service policy.

6 Claims, 6 Drawing Sheets

Server Functions
    Function *Start_Server*
        Out (server features, server location)
    Function *Push_Server_Status*
        If server status change
        Out (change in status)

FIG. 3A

Server Directory Interface
    Function *Register_Server*
        In (server features, server location)
        Modify directory to include new features
    Function *Update_Register*
        In (change in status)
        Modify directory to include status change
    Function *Service_Request*
        In (Service Request)
        Execute request as independent operation without any coupling
    Function *Load_Balance*
        In (Server Directory)
        If load imbalance condition 1
            update server directory to redistribute load
        If load imbalance condition 2
            change back-up server status to primary server status
        If load imbalance condition 3
            change primary server status to back-up server status

FIG. 3B

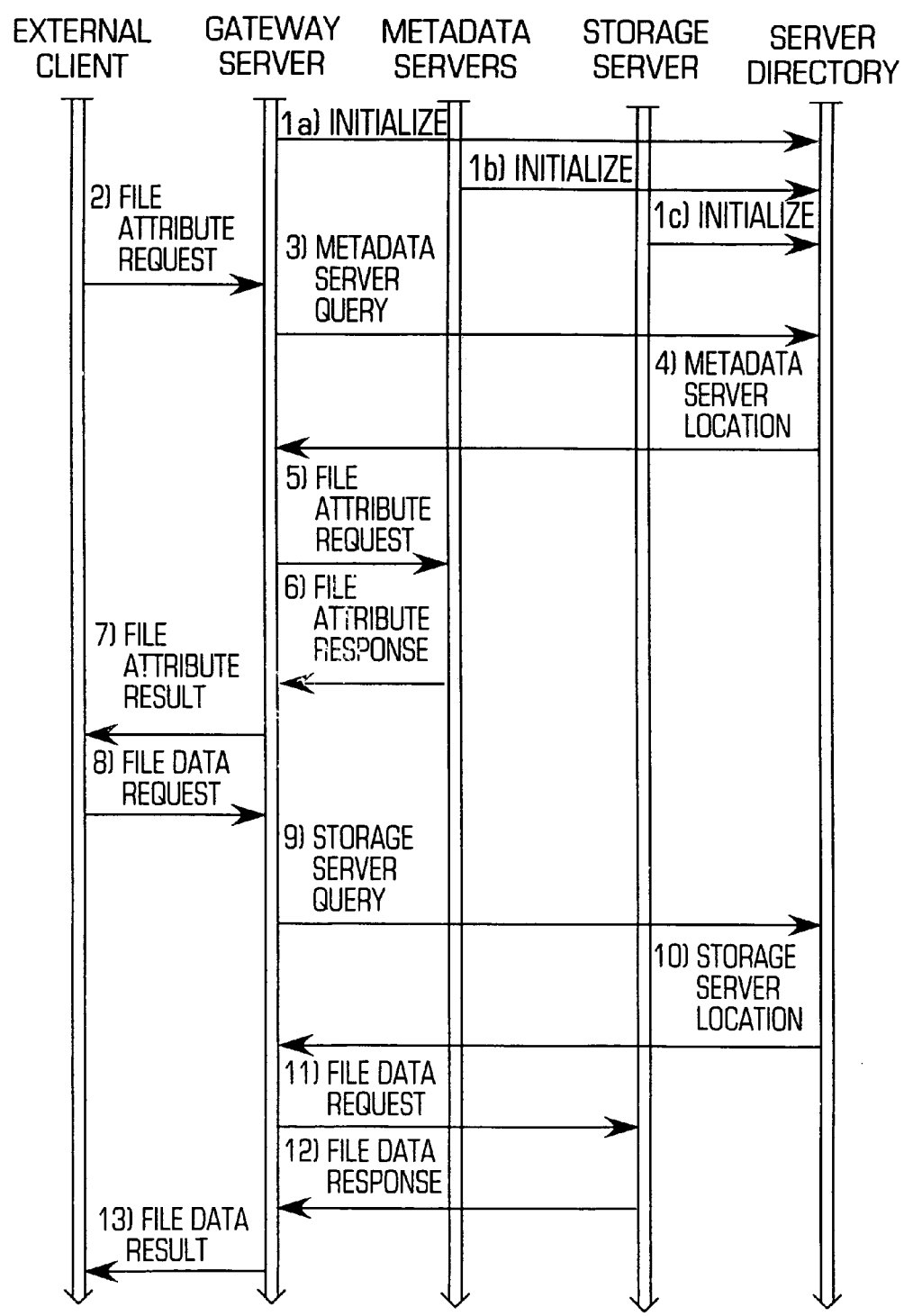

Gateway_Server Functions
    Function *Register_Gateway_Server*
        Out (**hosted application service requirements,
        gateway server location**)
    Function *Gateway_Server_Status*
        If gateway server resources out of range
        Out (features that are out of range)

FIG. 6A

Metadata_Server Functions
    Function *Register_Metadata_Server*
        Server Features = location, metadata range accessed,
        storage total, storage used
        Out (Server Features)
    Function *Metadata_Server_Status*
        If metadata server resources out of range
        Out (features that are out of range)

FIG. 6B

Storage_Server Functions
    Function *Register_Storage_Server*
        File Server Features = location, range of files accessed,
        storage total, storage used
        Out (Storage Server Features)
    Function *Storage_Server_Status*
        If storage server values out of range
        Out (features that are out of range)

FIG. 6C

SCALABLE STORAGE SYSTEM

TECHNICAL FIELD

The present invention relates generally to computing systems, and more particularly to a method and apparatus for a highly scalable storage system.

BACKGROUND OF THE INVENTION

Increasingly, large-scale enterprises and co-location hosting facilities rely on the gathering and interpretation of large amounts of information. One approach to meeting information storage and access needs can include a network storage system (NSS). A network storage system may include one or more interconnected computing machines that can store and control access to data. In many conventional approaches, a NSS may include multiple servers that have access to storage media. Such servers may be coupled to one another in a functional manner.

Conventional approaches to a NSS will now be described. Referring now to FIG. 7, a NSS is shown in a block diagram and designated by the general reference character 700. A NSS 700 may include a number of servers 702-0 to 702-*n* and storage media sets 704-0 to 704-*n*. In the particular example of FIG. 7, each server (702-0 to 702-*n*) has a physical connection to a corresponding storage media set (704-0 to 704-*n*).

Each server (702-0 to 702-*n*) may run an application that can access data on storage media (704-0 to 704-*n*). More particularly, each server (702-0 to 702-*n*) may run an instance of a file server application. Such applications are shown in FIG. 7 as items 706-0 to 706-*n*.

FIG. 7 shows an example of servers with this type of configuration. In such a configuration, each storage media set (704-0 to 704-*n*) may store a predetermined set of files that is accessible by a corresponding server (702-0 to 702-*n*). Servers (702-0 to 702-*n*) may receive a request to access a file. How such a request is serviced may depend upon where the file is located with respect to the server. For example, server 702-0 may receive a request to access a file in storage media set 704-0. An application 706-0 may service the request by directly accessing storage media set 704-0. A drawback to this approach can be the inability to scale such storage systems. Dividing access to files among a predetermined number of servers may allow server operation to be optimized for the set of files. However, if one or more servers fail, the data is not accessible. In addition, changes in file and/or access patterns to files can result in a load imbalance, as one server may service more requests (either directly or by way of function shipping) than the other servers. Such a load imbalance may slow the entire system down and can be inefficient in terms of resource use.

Yet another drawback to a conventional share-nothing system 700 can be that the number of servers (702-0 to 702-*n*) is essentially locked to one value at the start ("n" in the example of FIG. 7). Consequently, increases in the number of servers can be an expensive process as files may be redistributed across media sets and the servers re-optimized for the new file distribution.

Referring now to FIG. 8, a second example of a conventional NSS is shown in a block diagram and designated by the general reference character 800. As in the case of the first example in FIG. 7, a NSS 800 may include a number of servers 802-0 to 802-*n* and storage media sets 804-0 to 804-*n*. FIG. 8 shows an example of servers that have a "share everything" configuration. In a share everything configuration, each server (802-0 to 802-*n*) may have access to all storage media sets (804-0 to 804-*n*). Thus, as shown in FIG. 8, servers (802-0 to 802-*n*) may be connected to storage media sets (804-0 to 804-*n*) by way of a sharing interface 808. A sharing interface 808 may include storage media that can be accessed by multiple servers. For example, multi-ported storage disks, or the like. In addition, or alternatively, a sharing interface 808 may include a software abstraction layer that presents all storage media sets (804-0 to 804-*n*) as being accessible by all servers (802-0 to 802-*n*).

A conventional NSS 800 may also present added complexity in relation to scaling and/or load balancing. When scaling a system 800 up or down, as components are added to or removed from a system, a system may have to be restarted to enable each instance of an application 806-0 to 806-*n* to account for such increased/decreased resources. Such an operation can enable each instance to utilize the new, or newly configured resources of the system.

Yet another drawback to a share everything conventional NSS 800 can arise out of approaches in which a sharing interface includes a software abstraction layer 808. In such cases, particular servers may have a physical connection to particular media sets (804-0 to 804-*n*). A software abstraction layer 808 and/or application (806-0 to 806-*n*) may then perform operations similar to the function shipping previously described in conjunction with FIG. 7. Further, in such cases an abstraction layer 808 and/or application (806-0 to 806-*n*) may have to keep track of which servers have a physical connection with which particular storage media sets (804-0 to 804-*n*) in order to coordinate such function shipping.

Various ways of implementing server directories in distributed systems, including network storage systems, are known in the art, such as LDAP, NIS, and Domain Name Service. As one example, the Domain Naming Service (DNS) protocol can enable communication between servers by way of a domain name server. As is well understood, a domain name server can access root name servers and master name servers to find the Internet Protocol (IP) address of a host machine. While such an approach can provide an efficient way of mapping a domain name to an IP address, it may not be suitable for scalable storage systems.

As another example, to utilize the advantages of object oriented programming, distributed systems can include naming services. The Common Object Request Broker Architecture (CORBA) Naming Service is one example. As is well understood, in a system that uses the CORBA Naming Service, clients may invoke objects by way of an interface, where such objects may be remote instances.

While DNS and CORBA Naming Service provide naming services for distributed systems and can be incorporated into the present invention, there remains a need for a particular implementation of a server directory that provides naming services to a storage system that may be highly scalable without some or all of the drawbacks to conventional approaches described above.

SUMMARY OF THE INVENTION

According to the disclosed embodiments, a storage system may include a number of servers that provide storage system functions. Servers may be functionally de-coupled, with each server servicing requests to the storage system independent of requests to other servers. This is in contrast to conventional approaches that may include servers running applications that track the activity of all servers to enable function shipping and load balancing.

According to one aspect of the embodiments, servers in a storage system may be arranged into different services that can each provide unique storage service functions. Such services may include a gateway service that may host client processes and generate service requests, a metadata service that may access metadata for stored files, and a bitfile storage service that may access stored files.

According to another aspect of the embodiments, a storage system may include a server directory that may be accessed to locate a server to service a particular request.

According to another aspect of the embodiments, a server may be added to a system by registering with a server directory. In this way, servers may be added without having to notify other servers, as the servers may be functionally de-coupled from one another. In this way, servers may be added to a system for load balancing and/or fault tolerance. Because other servers do not have to be notified, the addition of a server may be a faster and/or less complicated operation than other conventional approaches.

BRIEF DESCRIPTION OF THE DRAWINGS

FIGS. 3A and 3B show various functions that may be included in a system according to a first embodiment.

FIG. 5 is an operational diagram of the embodiment of FIG. 4.

FIGS. 6A to 6C show various functions that may be included in a system according to a second embodiment.

DETAILED DESCRIPTION OF THE EMBODIMENTS

Various embodiments of the present invention will now be described in conjunction with a number of diagrams. The various embodiments include a highly scalable storage system. Further, such a storage system may include functional services that are de-coupled from one another, enabling each service to be extensible to meet increasing and/or decreasing demands of a system.

Figure 1:
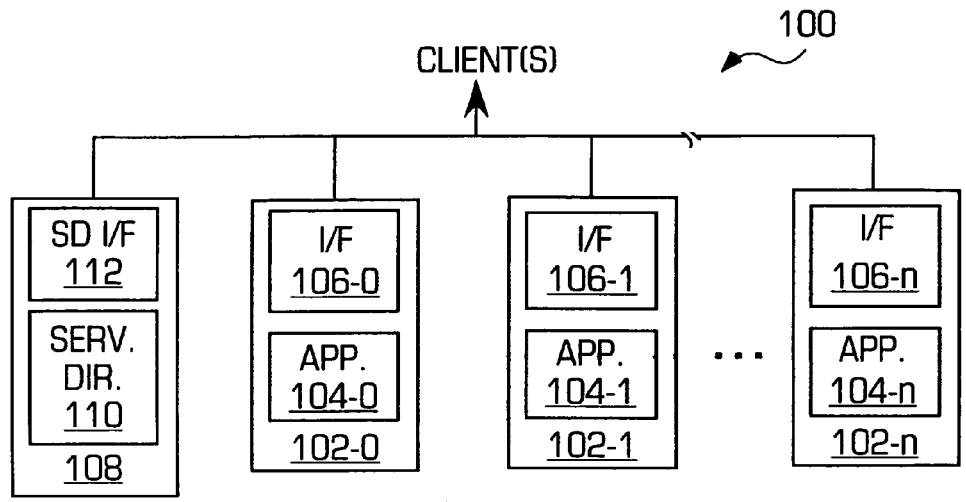
FIG. 1 is a block diagram of a storage system according to a first embodiment.

Referring now to FIG. 1, a storage system according to a first embodiment is shown in a block diagram and designated by the general reference character 100. A storage system 100 may include a number of system servers 102-0 to 102-n, which may each provide a storage system function according to a received request. In the embodiment of FIG. 1, each system server (102-0 to 102-n) may run a storage service application (104-0 to 104-n) that can provide one or more particular storage service functions. As but a few of the many possible functions, a storage service application (104-0 to 104-n) may include a gateway service that can host a client application (internal client), a metadata service that can access metadata for various files in a storage system, and/or a file storage service that can provide access to the files in a storage system.

Each server (102-0 to 102-n) may also include one or more application interfaces (106-0 to 106-n) associated with the components of a storage service application (104-0 to 104-n). Application interfaces (106-0 to 106-n) can indicate functions that may occur between system components, more particularly between server applications and/or between an external client and server. Examples of such interface and application functions will be described in more detail below.

A first embodiment 100 may also include a request routing server 108. A request routing server 108 may include a server directory 110. A server directory 110 may be a process running on a request routing server 108 or may be a process activated by a request routing server 108, as but two examples. A server directory 110 may maintain feature information on the various servers in the system 100. Feature information may include what particular functions a server is capable of performing. As servers are added, removed, or undergo changes in status, a server directory 110 may be updated accordingly. Thus, the information maintained by a server directory 110 can include a list of all available servers, and further, include an indication of what particular requests a server may service.

A server directory 110 may be accessed in conjunction with a request (from an external client for example) for a particular service by the system 100. A server directory 110 can then return the location of one or more servers that may be best suited for the request. As but a few of the many possible approaches, particular server locations may be selected according to a load balancing method, a client's quality of service (QoS), or some combination thereof. Upon receipt of one or more server locations, a requesting process may then access a server directly to service a request.

As is well understood in the art, a QoS policy for a particular client can determine how a particular request is serviced within a system 100. As but one example, system servers (102-0 to 102-n) may communicate with one another by a connectionless service. In such a case, the QoS policy for a particular request can affect the scheduling of the request on gateway servers and any of the servers in the system. This means that the QoS policy can determine which request is scheduled first based on the QoS policy in place for each of the requests waiting to be processed. Among the various features that may be included in a QoS policy are latency, guarantees of availability, and/or error probability, to name just a few. As is also well understood, in a connectionless service, a field within a data packet header may contain information indicating a QoS. Network nodes (e.g, routers, switches, bridges) may forward packets according to the particular QoS policy being applied.

In addition, or alternatively, there may be a differentiation of services between servers themselves. More particularly, two servers may provide the same service, however, one server may provide a higher level of service than another due to more powerful resources (in hardware, software or both). Consequently, differentiation in QoS can be established according to which particular server is selected to service a request.

It is understood that while the embodiment of FIG. 1 shows a server directory 110 as residing on a request routing server 108, a server directory 110 may reside on other servers, such as system servers 102-0 to 102-n. Further, multiple instances of a server directory 110 may reside on multiple servers, with each instance being updated. Such updates may occur in a synchronous or asynchronous manner.

It is noted that system servers (102-0 to 102-n) may be conceptualized as being "de-coupled" from one another. As noted above, a requesting process can receive a server location and then access a system server (102-0 to 102-n). Consequently, a system server (102-0 to 102-n) can process independent operations without any coupling. This is in contrast to conventional approaches where multiple instances of an application can be run on multiple servers, with some coupling process coordinating the operation of the multiple servers.

It is further noted that a system 100 may be scaled up or down with relative ease as compared to other conventional approaches. To scale up resources, a server may be added to a system 100. Such a newly added server may be a server that has recently been physically connected to a system and/or a server that has been switched from a standby mode to primary mode, that is responsible for handling requests. In the case of a recently connected server, an application interface (106-0 to 106-n) may include functions that "push" the features of the new server to a server directory 110 when the new server registers. In the case of a server switched from a standby mode, the standby server, which is already registered, becomes the primary. Such a step may be as simple as altering status data corresponding to the new server. It follows that resources may be scaled down by switching a server to a standby mode.

In this way, by providing a system with de-coupled servers, resources may be added to a system with relative ease.

A first embodiment 100 can also provide a high-degree of fault tolerance. As but one example, a system 100 may include a back-up server. A back-up server may be initially configured to replace a particular primary server or type of server. Thus, when the particular server or type of server fails, the back-up server can be switched from a standby to a primary mode. In addition or alternatively, a back-up server may have an initially limited configuration. When another server fails, the back-up server can be configured to replace the failed server, by loading a particular application and/or transferring stored files to thereby include the same capabilities of the replaced server.

Figure 2:
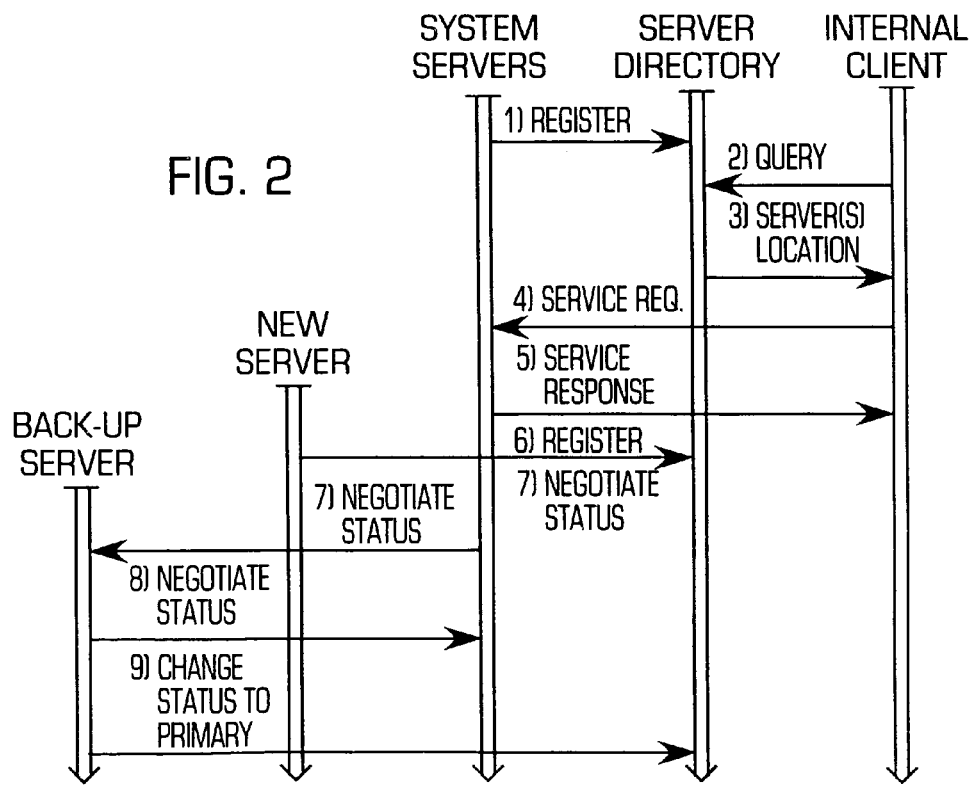
FIG. 2 is an operational diagram of the embodiment of FIG. 1.

To better understand the operation of the first embodiment, an operational diagram of a first embodiment is shown in FIG. 2.

In FIG. 2, various actions are shown in an order indicated by the numbered steps 1 through 9. Step 1 shows how servers may register with a server directory. Such a process may include each server providing a server directory with its location and available services. Following a step 1, a system may be capable of handling storage service requests.

Steps 2 to 4 show a typical storage service request. An internal client application may have need for a particular storage service. An internal client may first query a server directory for a server capable of servicing the request (step 2). A server directory may then return the location of one or more available servers (step 3). In one particular approach, a server location may be returned according to a QoS value.

It is noted that different QoS policies may be assigned to external clients according to a Service Level Agreement (SLA). A SLA may exist between a system and a customer. Thus, when a customer external client initially establishes a connection to a system, requests can be services with a QoS established by a SLA with the customer.

Once an internal client (e.g., a hosted client application) receives a server location, such location information may be used to access a server and service the request (step 4). An accessed server may provide a response to the request (step 5).

Steps 6-9 show how servers may be added to a system. Such an action may be taken in order to balance server loads and/or address the failure of another server, for example. In step 6, a new server has been added and registers with the server directory. A server interface may push server features to a server directory, thereby making the server directory aware of the newly added resource. Server features may be the same as those provided to a server directory upon registration of a system; namely the server's location and the services that may be undertaken by the server. Steps 7-9 show one example of how a back-up server, becomes the primary. A server directory can monitor the status of all servers as well as the load on each server. If a server fails, or increased resources are needed to reduce the load on one or more servers, the back-up server may become primary. A back-up server may already be registered but marked within a server directory as having a standby state. The back-up server may then become the primary.

Particular examples of server functions that may be included in the various embodiments will now be described in more detail. It is understood that the described functions represent but particular examples of functions that may be included and should not be construed as necessarily limiting the invention thereto.

Referring now to FIG. 3A, server functions are shown in pseudocode form. Server functions may be included in an application interface, such as those shown as items (106-0 to 106-n) in FIG. 1. The interface of FIG. 3A shows a function Start_Server that may be executed when a server first registers. As noted above, while such a function may be executed when the entire system is first started, registration may also occur when a server is first added to a system that is already in operation.

As shown in FIG. 3A, a Start_Server function can provide a server location and server features. It is noted that such information is not provided to other system servers, but to a server directory. Thus, system servers may be conceptualized as being de-coupled from one another as location and feature information is not shared between servers that provide the same function.

Another function is shown in FIG. 3A as Push_Server_Status. A Push_Server_Status function can interact with a server directory to ensure that server information is current. Thus, when the status of a server changes, information recording such a change can be forwarded to a server directory. A server directory may then modify a list of servers to reflect the changes.

Referring now to FIG. 3B, a server interface is shown in pseudocode form. A server interface may enable interaction between a server directory and system servers. While a server interface may include various functions, four particular functions are shown in FIG. 3B. A Register_Server function may receive server location and feature information from a server. Such information can be organized within a server directory to enable the server directory to select a particular server in response to a request. In the particular example of FIG. 3B, a server directory can modify a server directory table each time a server is registered.

A server interface may also include an Update Register function. An Update_Register function may receive change in status information from a server. As in the case of the Register_Server function, in one arrangement, a server directory can modify a directory in response to such status information.

A server interface may also include a Service_Request function. A Service_Request function may receive one or more service requests. Such requests may then be executed to provide a server response. The Service_Request function of FIG. 3A emphasizes the de-coupled nature of a system server. In particular, services can process independent operations without any coupling . . . A Load_Balance function shown in FIG. 3B provides one limited example of an approach to load balancing. A Load_Balance function may receive, as input, a server directory. A server directory may include load information for each active server. According to such load information, a server directory can make load adjustments. While load adjustments may take a variety of forms, in the example of FIG. 3B, a server directory may take various actions according to load conditions. Such actions may include updating entries in a directory table to balance server loads (e.g., changing which services a server may provide), changing back-up server status to primary server status, and/or changing a server status to back-up (in the case where load is too low and/or resources are used inefficiently).

FIGS. 1 to 3B described one example of a system that includes de-coupled servers. According to another embodiment of the present invention, multiple such systems may be grouped together into particular functional services of an overall storage system. Each such service may be de-coupled from one another. In such an arrangement, scaling, optimization of resources and/or load balancing may occur on a service-by-service basis.

Figure 4:
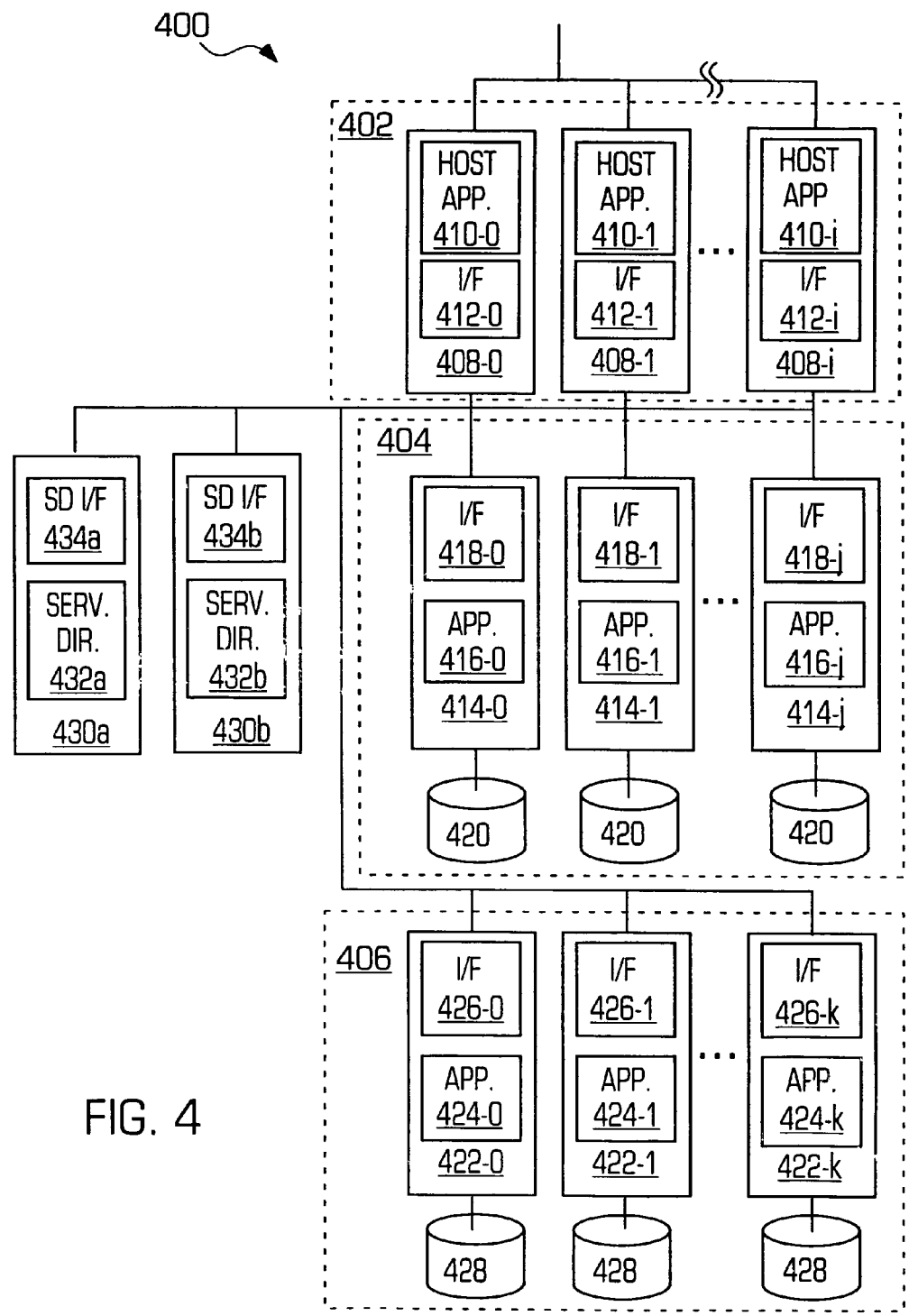
FIG. 4 is a block diagram of a storage system according to a second embodiment.
Figure 7:
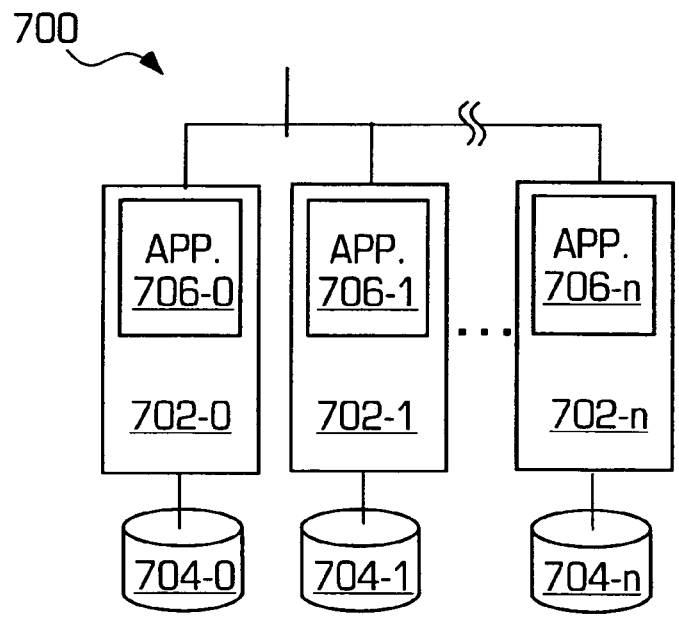
FIG. 7 is a block diagram of a first conventional network storage system.
Figure 8:
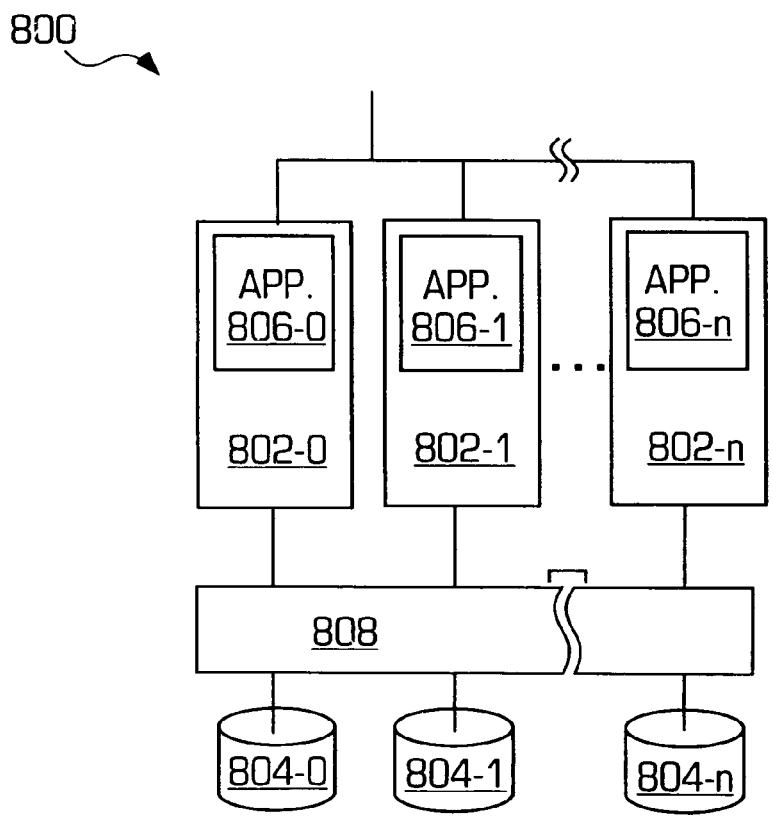
FIG. 8 is a block diagram of a first conventional network storage system.

Referring now to FIG. 4, a second embodiment is set forth in a block diagram and designated by the general reference character 400. In FIG. 4, a storage system 400 may include three services: a gateway service 402, a metadata service 404, and a bitfile storage service 406. Thus, storage system tasks can be de-coupled from one another allowing each service to be scaled as needed. Various services (402, 404 and 406) may interact with one another over a set of networking protocols for example, and without limitation, over a redundant non-blocking switched network.

A gateway service 402 may interact with an external client, and process client requests opaquely. For example, an external client may send a request that results in one or more accesses/queries to one or more services (404 or 406). However, a client can remain unaware of such multiple accesses/queries. A gateway service 402 may interact with a client over a set of networking protocols.

A metadata service 404 may interact with a gateway service 402 to service metadata related requests. In addition, a metadata service 404 may interact with the bitfile storage service 406 to handle its storage needs. As is well known in the art, metadata may include predetermined information on files contained in the storage system 400. A metadata service 404 may be conceptualized as being de-coupled from the other services as metadata requests can be serviced as independent operations without any coupling. One example of a system that may be included in a metadata service is disclosed in a commonly-owned co-pending U.S. patent application Ser. No. 09/659,107, entitled STORAGE SYSTEM HAVING PARTITIONED MIGRATABLE METADATA filed on Sep. 11, 2000 by Nowicki (referred to hereinafter as Nowicki).

A bitfile storage service 406 may interact with a gateway service 402 to service file access requests. The term file as used herein is equivalent to the terms bitfile and file data, and can be for example and without limitation, file content (data) of a file, file extents (variable size portion of a file), set of blocks of data (in a block oriented storage), etc. The terms bitfile, file data, and file should not be construed as to limit the invention to any particular semantic.

Still further, a file may include structured data. In such a case a bitfile storage service 406 may store content in a predetermined format suitable for structured data query interfaces, such as a structured query language (SQL) interface. As but one possible arrangement, data may be logically arranged into tables that are further divided into data blocks. Such data blocks may be are physically separated between services. For example, retrievable data may be arranged as row data on storage media within a bitfile storage service 406. However, block header, block transaction and/or table and row directory information may be stored on media in a metadata service 404.

A bitfile storage service 406 may store files for access by a client. As in the case of a metadata service 404, a bitfile storage service 406 may be conceptualized as being de-coupled from the other services as file access requests can be serviced as independent operations without any coupling.

In the example of FIG. 4, a gateway service 402 may include a number of gateway servers 408-0 to 408-$i$, where $i$ is an arbitrary number. A gateway server (408-0 to 408-$i$) may host one or more client applications for accessing files in the storage system 400. Hosted applications are shown in FIG. 4 as items 410-0 to 410-$i$. A hosted application (410-0 to 410-$i$) may have a corresponding interface 412-0 to 412-$i$ that can enable interaction between a hosted application and other system services, as will be described in more detail below.

Gateway servers (408-0 to 408-$i$) may be de-coupled from one another as described in conjunction with FIG. 1. For example, each gateway server (408-0 to 408-$i$) may service requests as independent operations without any coupling.

As shown in FIG. 4, a metadata service 404 may include a number of metadata servers 414-0 to 414-$j$, where $j$ is an arbitrary number. A metadata server (414-0 to 414-$j$) may include a metadata application that can access metadata for an internal client for example and without limitation, a gateway server. The metadata accesses are according to external client requests. Such accesses may vary according to a particular metadata attribute (e.g., file system). Metadata server applications are shown as items 416-0 to 416-$j$. A metadata server application (416-0 to 416-$j$) may have a corresponding interface 418-0 to 418-$j$. A metadata application interface (418-0 to 418-$j$) can enable interaction between a metadata application and other system services, as will be described in more detail below.

Like the gateway servers (408-0 to 408-$i$), metadata servers (414-0 to 414-$j$) may be de-coupled from one another. In the example of FIG. 4, metadata servers (414-0 to 414-$j$) can access metadata stored on metadata storage media 420. It is understood that each metadata server (414-0 to 414-$j$) can include a physical connection to metadata storage media 420. The physical connection can include for example and without limitation a network, fibre channel, or a connection customarily found in direct-attached storage systems, NAS, or SAN systems.

Referring once again to FIG. 4, a bitfile storage service 406 may include a number of storage servers 422-0 to 422-$k$, where $k$ is an arbitrary number. A storage server (422-0 to 422-$k$) may include one or more storage server applications (424-0 to 424-$k$) that can access files for an internal client, for example and without limitation n, a gateway server. The file accesses are according to external client requests. Such accesses may include, without limitation, read, writes, file creation, file deletion and/or file archiving. Storage server interfaces 426-0 to 426-$k$ may be provided that correspond to storage server applications (424-0 to 424-$k$). Storage server interfaces (426-0 to 426-$k$) may enable interaction between a storage server application and other system services, as will be described in more detail below.

Like the servers of the other services (402 and 404), storage servers (422-0 to 422-$k$) may be de-coupled from one another. Each storage server (422-0 to 422-$k$) may have access to bitfile storage media 428 by way of some physical connection. The physical connection can include for example and without limitation a network, fibre channel, or a connection customarily found in direct-attached storage systems, NAS, or SAN systems.

A storage system 400 according to a second embodiment may further include one or more request routing servers 430a and 430b. A request routing server (430a and 430b) may include server directories 432a and 432b. A server directory (432a and 432b) may be queried to receive the location of a server that can service a given request. In one particular arrangement, a server directory (432a and 432b) may be queried by a gateway interface (412-0 to 412-i) in response to an external client request. A server directory (432a and 432b) may then return the location(s) of one or more servers that can service a request.

It is understood that a server directory (432a and 432b) may take a variety of forms. As but one example, a server directory (432a and 432b) may exist for each service of the system 400. Consequently, in response to metadata requests, a metadata server directory can return the location of one or more metadata servers, and in response to a storage server request, a storage server directory can return the location of one or more storage servers. Further, metadata server, storage server, and gateway server directories may also monitor servers (e.g., status, loads, etc.) and revise server directory tables accordingly. Of course, one server directory may exist for multiple (including all) services of a system.

Server directories (432a and 432b) may have corresponding server directory interfaces (434a and 434b). Server directory interfaces (434a and 434b) can enable interaction between server directories (432a and 432b) and the various other servers of the storage system 400.

In alternate arrangements, gateway servers (408-0 to 408-i) may each cache all or a portion of a server directory. In such cases, queries to find an available/appropriate server for a given request may include a process internal to a gateway server.

To better understand the operation of the second embodiment, an operational diagram of a second embodiment is shown in FIG. 5. In FIG. 5, various actions are shown in an order indicated by the numbered steps 1a through 13.

Steps 1a to 1c show how servers of different services may register with a server directory. In the particular example of FIG. 5, such a registration may occur at the server start. Of course, servers may be added to the various services of the storage system 400 in the same general fashion as described with reference to the system of FIG. 1. That is, as a new server is started, it can register with a server directory.

Once the various servers of a storage system have been registered in one or more server directories, requests from an external client may be serviced. Steps 2-7 show how a metadata request may be serviced. A gateway server may receive a metadata request from a external client (step 2). In FIG. 5, the particular metadata request is a file attribute request (e.g., list a directory, search a directory, etc.). In response to such a request, a gateway server may query a server directory indicating that the query is for a metadata service (step 3). In response to a query from a gateway server, a server directory may provide the location of one or more metadata servers to service the request (step 4). Such a step may include determining which particular metadata server(s) have access to the desired directory. Such a step may also include selecting the metadata server(s) according the current loading of the metadata servers and/or the QoS of a particular customer.

Step 4 shows how a gateway server may receive a metadata server location (or list of locations) from a server directory. A gateway server may then access a metadata server according to the metadata server location(s) provided. A metadata server may then service the request (e.g., return directory information) (step 6). Request results (file data) may then be passed on to an external client (step 7).

It is noted that the various queries and requests by a gateway server can be opaque to the external client. Further, it is understood that metadata servers receive and execute requests as they arrive, and do not have to include processes that monitor various other requests that may be received by other metadata servers. Such de-coupling can enable metadata servers to be added, and in some cases, removed without having to re-index stored metadata.

Steps 8-15 show how a file access request may be serviced. A client may determine an identification value for a desired file (file id). Alternatively, a file id may be created for the external client in the case of new file. As but one example, an external client may retrieve a particular file id with a metadata server access, as previously described.

In step 8, an external client makes a file access request. Such a request may include a file id for a given file. In response to such a request, a gateway server may correlate this to a file locator indicating the type of file access requested (i.e., read, write, archive) (step 9). With this file locator, the gateway server may query the server directory to identify a storage server that can process the requests. In response to such a query from a gateway server, a server directory may provide the location of one or more storage servers to service the request (step 10). Such a step may include determining which particular storage server(s) has access to the desired file. As in the case of metadata servers, in one arrangement, storage server(s) may be selected for a given request according to the current loading of the storage servers and/or the QoS of a particular customer.

In step 11, a gateway server may receive a storage server location (or list of locations), and then access a storage server. A storage server may service the request according to client criteria (steps 12 and 13).

In this way, storage server operations may have the same advantages of previously described metadata operations. Each storage server may receive and execute requests as they arrive, without regard to requests received by other storage servers. Thus, storage servers may be added/removed without having to re-index the files stored.

In a storage system that includes de-coupled services, such as that of FIG. 4, the servers in various services may provide particular functions. Particular examples of functions will now be described, but it is understood that such functions are but examples, and should not be construed as necessarily limiting the invention thereto.

Referring now to FIG. 6A, a gateway server may include a Register_Gateway_Server function. Such a function may be executed when a new server is started, and can output the location of the gateway server and the service requirements for a hosted application. A server directory can receive such values as input. Status information may also be provided to a server directory. A Gateway_Server_Status function may forward gateway server feature information when particular values are out of a predetermined range. Such values may include, without limitation, number of hosted applications and number of requests. Values particular to machines may also be forwarded when out of range, such as connection speed and available memory. Of course, such values are but a few of the many possible values provided by a gateway server.

Metadata server functions are shown in FIG. 6B. In a similar fashion to the gateway server, a metadata server may include a Register_Metadata_Server function. Such a function may be executed when a metadata server is started, and can output the location of the metadata server and various features of the metadata server. In the example of FIG. 6B, the features output by a Register_Metadata_Server function may include range of metadata accessed, total amount of storage accessible by the server, and amount of storage used. Other machine particular information may also be provided. As but one example, available server memory (i.e., computer system memory, not storage) may be provided.

A Metadata_Server_Status function may operate in the same general fashion as a Gateway_Server_Status function. When metadata server features are out of range, such features are output to a server directory.

An example of a storage server interface is shown in FIG. 6C. A Register_Storage_Server function may be executed when a storage server is started, and can output the location of the storage server and various features of the storage server. In the example of FIG. 6C, the storage server features may include a range of file identifiers and total storage accessible by the storage server, as well as amount of storage used. Machine particular information may also be provided, as described in conjunction with the other interfaces.

A Storage_Server_Status function may operate in the same general fashion as a Gateway_Server_Status and Metadata_Server_Status functions. When storage server features are out of range, such features can be output to a server directory.

In a storage system that includes de-coupled services, such as that of FIG. 4, interfaces of the servers in various services may provide particular functions. Particular examples of functions will now be described, but it is understood that such functions are but examples, and should not be construed as necessarily limiting the invention thereto.

A gateway server interface may include a Gateway_Server_Request function. A Gateway_Server_Request function may receive a request for a gateway service from, for example and not limiting, a storage server. The results of a request may then be output.

A Metadata_Request function may receive a request for a particular metadata service from a gateway server. Such a request may then be serviced. The results of a request may then be output. A more detailed discussion of the various functions of a metadata server is disclosed in the previously-referenced, co-pending patent application of Nowicki.

A Storage_Server_Request function may receive a request for a particular service from a gateway server. The results of a request may then be output.

While various examples of interfaces and corresponding functions have been described, such examples represent but one embodiment of the present invention.

It is thus understood that while the preferred embodiments set forth herein have been described in detail, the present invention could be subject various changes, substitutions, and alterations without departing from the spirit and scope of the invention. Accordingly, the present invention is intended to be limited only as defined by the appended claims.

What is claimed is:

1. A file storage system, comprising:
a plurality of system servers connected to one another by a communication network having at least one node, wherein each system server includes at least one process that provides a file storage system function independent of the states of other system servers in response to a request to the file storage system that is capable of affecting multiple system servers, and wherein the file storage system functions include:
at least one file storage gateway service that includes a plurality of file storage gateway servers, each file storage gateway server hosting at least one client process that can process client requests and pass the resulting set of requests to the file storage system and including a process that is capable of accessing at least one server directory to determine the location of a system server that can service a generated client request;
at least one file data storage server service that includes a plurality of file data storage servers, each file data storage server including a process that accesses file data storage objects stored in the storage system independent of the file data storage objects accessed by other file data storage servers; and
at least one file metadata service that includes a plurality of file metadata servers, each file metadata server including a process that accesses a set of file metadata independent of the file metadata sets accessed by other file metadata servers;
wherein the at least one instance of a file data storage server service and at least one instance of a file metadata service are separate from each other such that the services are scalable independently of each other; and
wherein the at least one file storage gateway service is capable of locating a file metadata server corresponding to a file in response to a request, receiving metadata for the file from the located file metadata server, and locating one or more corresponding file data storage servers for the file using the received metadata, wherein the file metadata server and file data storage server are separate and independent from each other.

2. The file storage system of claim 1, further including:
at least one server directory that includes location information and service capabilities of the system servers, the at least one server directory providing at least one server location in response to a request to the file storage system.

3. The file storage system of claim 1, further including:
a routing request server that provides system server location information in response to a request to the storage system, the location information corresponding to a system server that is capable of servicing the request.

4. A file storage system, comprising:
a plurality of servers arranged into at least two services, each service providing different file storage system functions independent of the status of any other service, and the servers of each service being functionally de-coupled from one another, servicing requests, which may affect multiple servers, independent of the operation of other servers of the service, the services including:
a file data storage server service comprising a plurality of file data storage servers that provide access to files stored in the file storage system, each file data storage server including an initialize function that may provide file data storage server location and file data storage server capability information, and
a file metadata service comprising a plurality of file metadata servers that provide access to metadata for files stored in the file storage system, each file metadata server including an initialize function that is capable of providing file metadata server location and file metadata server capability information;

a server directory process that receives information for a file storage system request and server location and capability information from the file data storage and file metadata servers, and that provides information to locate a server capable of servicing the request;

wherein at least one instance of a file data storage server service and at least one instance of a file metadata service are separate from each other such that the services operate independently of each other; and a plurality of file storage gateway servers, each file storage gateway server including a process that can access the server directory process to determine a location of a server capable of servicing a request and then access the server at the location to service the request, wherein the file storage gateway servers are capable of locating a file metadata server corresponding to a file in response to a request, receiving metadata for the file from the located file metadata server, and locating one or more corresponding file data storage servers for the file using the received metadata.

5. The file storage system of claim 4, wherein:

the file metadata server capability information includes a quality of service value.

6. The file storage system of claim 4, wherein:

the storage server capability information includes a set of files accessible by the file data storage server.

* * * * *